July 10, 1934.  A. E. JONSSON  1,965,958
VACUUM DRYING APPARATUS
Filed Sept. 9, 1931
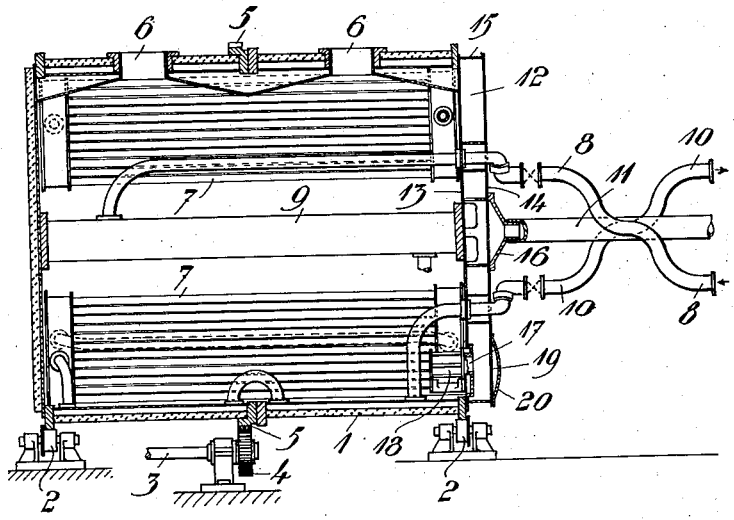
AUGUSTINUS EDVARD JONSSON
INVENTOR
BY Haseltine, Lake & Co.
ATTORNEYS Patented July 10, 1934

1,965,958

UNITED STATES PATENT OFFICE 1,965,958

VACUUM DRYING APPARATUS

Augustinus Edvard Jonsson, Daltorp, Lidingo, Sweden

Application September 9, 1931, Serial No. 561,845
In Sweden September 25, 1930

3 Claims. (Cl. 34—5)

The present invention relates to an arrangement in drying-apparatus of the kind, in which the mass is dried under vacuum by means of heating units arranged in the drying-receptacle. In such apparatus the air contained in the drying-receptacle and the vapors produced when the mass intended to be dried is being heated have been removed by conduits directly connected to the receptacle. At this juncture, strainers are placed in the receptacle in front of the openings of said conduits to prevent the mass in question from being removed at the same time as the air and the vapors. In such arrangements it has, however, been found that the vapors will easily condense in or immediately outside the strainers with the result that the condensate produced will be absorbed by impurities, dust and the like emanating from the mass in question and gathered in the strainers. The moist matter produced at this occasion will soon stop up the strainers, a fact which necessitates said strainers to be cleansed at short intervals, which evidently means a considerable inconvenience.

The present invention has for its object to avoid said inconvenience and this is arrived at by the fact that the vacuum conduit or conduits are connected to the drying receptacle by means of one or more chambers connected to the drying apparatus, said chambers communicating with the interior of the drying-receptacle by means of openings provided with strainers.

The annexed drawing shows an embodiment of the arrangement according to the invention.

Referring to the drawing, the drying-receptacle or drum 1 is supported by rollers 2 and adapted to be oscillated by a motor which is connected by means of a pinion 4 mounted on a driving shaft 3 to a toothed crown 5 running round the drum with which crown the pinion meshes. The drum 1 is provided with filling and discharging openings 6 for the mass to be dried, the latter being adapted to be heated by the units 7, fed, for instance, with steam. The steam is introduced through the conduit 8 to a pipe 9 centrally arranged in the drum and from this pipe it is distributed to the different units. After passing through the heating units the steam is carried off through the pipe 10.

The vacuum conduit 11 is connected to the drum by means of a chamber 12, which, in the embodiment shown in the drawing, consists of one end wall 13 of the drying-drum, the wall 14 and a cylindrical portion 15. The connection of the chamber 12 with the vacuum conduit consists of the pipe 16 located centrally at the chamber. Further, the chamber 12 communicates with the interior of the drum by the openings 17 located in the wall 13 and covered with strainers of any suitable kind 18.

When the drying-drum 1 is connected to the source of vacuum, the vapors and the air contained in the drum will be carried off through the strainers 18, the openings 17 and the chamber 12 to the vacuum conduit 11. On account of the chamber 12 being heated by the heat from the heating units 7 in the drum or by a special heating-arrangement, the escaping vapors are prevented from being condensed in the proximity of the strainers 18, and this condensation will begin at first in the conduit 11. The condensate produced at this point is prevented from flowing back to the strainers. The latter will, thus, be maintained dry and function without disturbances.

However, it may be necessary to have access to the strainers 18, if for any reason, they need to be inspected. For this purpose openings 19 are arranged in the wall 14 of the chamber in front of each strainer; said openings being normally kept closed by removable covers 20.

It should be noted that only one embodiment of the invention is described above, and that the different details of the apparatus may be varied within vast limits without departing from the idea of the invention.

Having now particularly described the nature of my invention and the manner of its operation, what I claim is:

1. In vacuum drying apparatus including a movable drying receptacle which is interiorly provided with heating elements and is also provided with one or more filters communicating with a source of vacuum, a vacuum chamber both interposed between the outlet sides of said filters and said source of vacuum so as to cover said filters and provided with heating means in order to prevent condensation upon said filters.

2. A vacuum drying apparatus comprising the combination, with a movable drying receptacle provided with means associated therewith for indirectly heating the same interiorly, and one or more outlet ports occupied by filters, of an outer receptacle upon said drying receptacle containing a chamber both connected to the interior of said drying receptacle through the outlet ports and filters thereof and covering and protecting said outlet ports and the outlet sides of said filters, said outer receptacle being directly connected to a source of vacuum, and means associated with the outer receptacle for interiorly heating the same and preventing condensation on said filters and outlet ports.

3. A vacuum drying apparatus comprising the combination, with a movable drying receptacle interiorly provided with heating elements for heating the contents of said receptacle, and one or more outlet ports occupied by filters, of an outer receptacle containing a chamber both connected to the interior of the drying receptacle through the outlet ports and the filters thereof and covering and protecting said outlet ports and the outlet sides of said filters, said outer receptacle being directly connected to a source of vacuum, and conduits for distributing heating fluid to and withdrawing the same from said heating elements passing through the chamber in said outer receptacle into said drying receptacle in order to form heating means therein and prevent condensation upon said filters and outlet ports.

AUGUSTINUS EDVARD JONSSON.